United States Patent [19]

Watson et al.

[11] Patent Number: 4,988,399
[45] Date of Patent: Jan. 29, 1991

[54] PROCESS FOR MAKING A THREE-PIECE CONTAINER INVOLVING STRETCH-BLOW MOLDING, SEVERING AND ATTACHING AN END PANEL TO THE OPEN BOTTOM

[75] Inventors: Martin J. Watson, Murrysville; Thomas L. Levendusky, Greensburg, both of Pa.

[73] Assignee: Aluminum Company of America, Pittsburgh, Pa.

[21] Appl. No.: 375,528

[22] Filed: Jul. 5, 1989

[51] Int. Cl.$^5$ .................. B29C 49/04; B29C 49/10; B29C 49/64

[52] U.S. Cl. ................. 156/73.5; 29/412; 29/512; 264/25; 264/68; 264/521; 264/527; 264/532; 264/535; 425/529

[58] Field of Search .......... 264/25, 68, 521, 527, 264/532, 535; 425/526, 527, 529; 156/73.5; 29/412, 512

[56] References Cited

U.S. PATENT DOCUMENTS

| | | |
|---|---|---|
| 1,310,441 | 7/1919 | Roberts . |
| 3,328,498 | 6/1967 | Cheney ............... 425/527 X |
| 3,457,590 | 7/1969 | Dittmann ............... 18/5 |
| 3,525,123 | 4/1970 | Cines et al. ............... 264/521 X |
| 3,594,864 | 7/1971 | Gilbert ............... 425/529 |
| 3,733,309 | 5/1973 | Wyeth et al. ............... 260/75 |
| 3,950,459 | 4/1976 | Seefluth ............... 264/532 X |
| 4,067,944 | 1/1978 | Valyi ............... 264/532 X |
| 4,076,071 | 2/1978 | Rosenkranz ............... 264/521 X |
| 4,103,411 | 8/1978 | Gottsegen ............... 29/416 |
| 4,334,627 | 6/1982 | Krishnakumar ............... 215/1 |
| 4,447,199 | 5/1984 | Reed et al. ............... 425/182 |
| 4,496,408 | 1/1985 | Hahn ............... 264/512 X |
| 4,547,416 | 10/1985 | Reed et al. ............... 428/36 |
| 4,735,538 | 4/1988 | Reed et al. ............... 413/5 |
| 4,796,766 | 1/1989 | Clark ............... 264/532 X |

FOREIGN PATENT DOCUMENTS

2145027 3/1985 United Kingdom .

OTHER PUBLICATIONS

Modern Plastics, Apr. 1977, "Stretch-Blow Molding", Dan Kelly, pp. 70–72.

Primary Examiner—Jan H. Silbaugh
Assistant Examiner—Catherine Timm
Attorney, Agent, or Firm—William J. O'Rourke, Jr.; Glenn E. Klepac

[57] ABSTRACT

A method of producing a pair of container bodies. A cylindrical, hollow preform of a thermoplastic polymer material having a cylindrical body having a sidewall and an opened neck finish on each longitudinal end of the preform is provided. The preform is heated to a temperature above the glass transition temperature of the polymer and below the melting temperature of the polymer, and is stretched. The preform is stretched longitudinally by applying force to at least one of the ends, and is stretched transversely by introducing fluid pressure into the preform sufficient to form a stretch blown component having a first neck at one end and a second neck at the other end, and a body portion between the necks. The stretch blown component is separated transversely through the body to provide two container bodies, each having a neck finish corresponding dimensionally with the respective neck finish on the preform from which the container bodies are stretch-blown. The container bodies each have an open bottom end spaced longitudinally from the respective neck. A three-piece, biaxially oriented container is provided by attaching an end panel to the open bottom end of the container body and providing a mating closure onto the neck finish.

38 Claims, 5 Drawing Sheets

PROCESS FOR MAKING A THREE-PIECE CONTAINER INVOLVING STRETCH-BLOW MOLDING, SEVERING AND ATTACHING AN END PANEL TO THE OPEN BOTTOM

BACKGROUND OF THE INVENTION

The present invention relates to blow molding of thermoplastic container bodies. More particularly, this invention relates to the production of three-piece containers formed from tandem container bodies, blow molded from a hollow, thermoplastic preform having a neck finish on both ends thereof.

Blow molding of thermoplastics has been taught in the prior art. This art generally teaches the process as involving the steps of forming a hollow tube, heating the tube, then introducing a gas under pressure into the hollow tube. The pressurized gas expands the heated tube against a mold to form a shaped article. When the hollow tube is stretched mechanically in the longitudinal direction either before or during expansion with pressurized gas, the process is sometimes called stretch-blow molding.

Stretching of a thermoplastic material both longitudinally and transversely results in a high degree of biaxial orientation of the molecular structure of the thermoplastic material. Such biaxial orientation provides favorable properties including high tensile strength and yield strength, toughness or high resistance to impact, low creep at low weight to volume ratios and sufficient barrier properties which render this material useful in containing liquids under pressure.

Blow molding and stretch-blow molding are taught in the prior art including U.S. Pat. No. 4,447,199. The simultaneous production of multiple containers by blow molding a single hollow tube has also been taught in the prior art, including U.S. Pat. Nos. 3,457,590, 4,103,411 and 4,796,766.

One of the many challenges encountered in a blow molding operation is the ability to provide a blow molded container body having a neck finish of close dimensional tolerance onto which a closure is adapted to be applied. Blow molding threads into a neck finish, for example, is difficult. In fact, it is often necessary to perform subsequent neck finishing operations, after blow molding, in order to obtain or retain the close dimensional requirements of a neck finish, whether threads, crowns, lugs or otherwise.

Despite significant progress in this art and various alternative blow molding methods, there is still a need and a demand for further improvement. Accordingly, a new and improved method is desired which produces a pair of biaxially oriented container bodies in a blow molding process having neck portions which do not require subsequent finishing operations to assure the dimensional tolerance of the neck finish.

SUMMARY OF THE INVENTION

This invention may be summarized as providing a method of producing a pair of container bodies comprising the steps of providing a cylindrical, hollow preform of a thermoplastic polymer material having a cylindrical body comprising a sidewall and an opened neck finish on each longitudinal end of the preform. The preform is heated to a temperature above the glass transition temperature of the polymer and below the melting temperature of the polymer, and is stretched. The preform is stretched longitudinally by applying force to at least one of the ends. The longitudinal stretching can be accomplished by moving the clamping means away from one another at a substantially constant rate or holding one clamped end stationary while moving the other clamped end. The preform is stretched transversely by introducing fluid pressure into the preform sufficient to form a stretch blown component having a first neck at one end and a second neck at the other end, and an integral body portion between the necks. The stretch blown component is separated transversely through the body to provide two container bodies, each having a neck finish corresponding dimensionally with the respective neck finish on the preform from which the container bodies are stretch-blown. The container bodies each have an open bottom end spaced longitudinally from the respective neck. A three-piece, biaxially oriented container is provided by attaching an end panel to the open bottom end of the container body and providing a mating closure onto the neck finish.

Among the advantages of this invention is the provision of a method of blow molding a pair of biaxially oriented container bodies having neck portions which require no finishing operations to maintain their dimensional tolerance, and in which the neck finishes of the blown containers correspond dimensionally with the respective neck finishes on the preform from which the containers are blow molded.

Another advantage of this invention is the provision of a method of producing biaxially oriented container bodies at increased production rates, and at lower costs as compared to prior methods.

A further advantage of the present invention is the provision of a three-piece container having a biaxially oriented blow molded thermoplastic body, a base seamed to an open bottom of the body and a closure applied to a neck finish opposite the open bottom which container exhibits improved container base stability.

Another objective of this invention is to provide a method of blow molding a pair of container bodies from an elongated, generally cylindrical thermoplastic hollow preform having a neck finish on both longitudinal ends thereof, in which the neck finish is not subjected to appreciable stretching.

A feature of this invention is that the neck finishes on the longitudinal ends of the hollow preform correspond dimensionally to the neck finishes on the respective ends of the pair of containers which are blow molded from the preform.

These and other advantages and objectives of the invention will be more thoroughly understood and appreciated with reference to the following description and the accompanying drawings.

BRIEF DESCRIPTION OF THE DRAWINGS

FIG. 4 - feeding of the preform,
FIG. 5 - heating of the preform,
FIG. 6 - aligning a gripper and a mold,
FIG. 7 - closing the gripper and the mold,
FIG. 8 - stretch-blow molding of the preform, and FIG. 9 - ejecting the blown component.

DETAILED DESCRIPTION

Figure 1:
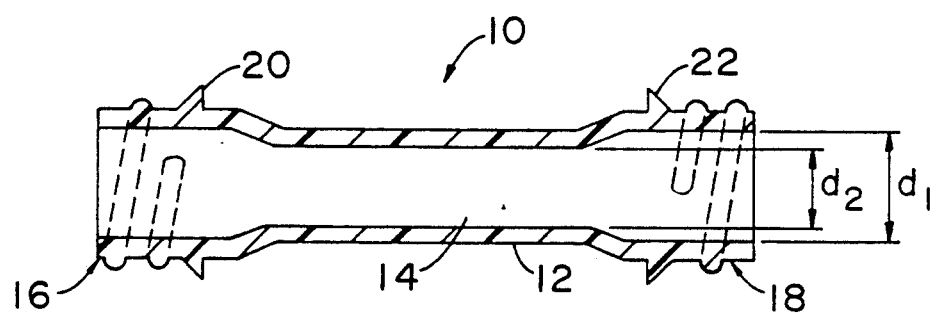
FIG. 1 is a cross-sectional view of a hollow preform of the present invention.

Referring particularly to the drawings, FIG. 1 illustrates a typical preform 10. The preform 10 is a generally cylindrical hollow body of a thermoplastic polymer material. Although a preferred thermoplastic polymer material for the preform is polyethylene terephthalate also called PET, other polyester and polyamide materials including, but not limited to, poly(ethylene-2,-6 naphthalate) also called PEN, and amorphous nylon are comprehended for the preform of the present invention. It will be appreciated by those skilled in the art that the thermoplastic polymer material of the present invention may include minor amounts, such as less than 10 mole percent, of a comonomer and minor amounts of additives such as stabilizers, antioxidants, ultraviolet light screening agents, dyes or pigments. Also, the preform and the resultant components may comprise multiple layers of dissimilar thermoplastic polymer materials, which may be used to improve barrier properties, i.e., resistance to oxygen permeability.

The hollow preform of this invention may be made by a number of techniques. For example, the preform may be provided by extruding a thermoplastic polymer material into an elongated, hollow, cylindrical tube. The extruded tube, or cylinder, may be cut into a number of discrete cylinders. The discrete cylinders may then be provided with a neck finish on both ends thereof. Another method of making the preform is to injection mold a thermoplastic polymer material. With appropriate molds and polymer materials, the preform may be injection molded with the neck finish on both opposed longitudinal ends of the injection molded cylinder, in the as molded condition, or the injection molded article may have a neck finish subsequently provided on both ends of the preform. The neck finish may be provided by spin welding cylindrical, hollow neck finish components to the opposed ends of a cylinder.

Regardless of the method used to provide the preform, the preform 10 has a substantially cylindrical body 12 and a hollow chamber 14 extending axially through the body 12. At each opposed longitudinal end of the cylindrical body are necks, namely a first neck portion 16 and a second neck portion 18. The neck portions are finished prior to the blow molding operation described in detail below. It will be appreciated by those skilled in the art that finished neck portions include those necks which require substantially no working to receive a mating closure thereon. Finished necks comprehend threaded portions, crowned portions, lugs or other structures adapted to accept a mating closure to seal the component about the neck.

In a preferred embodiment as illustrated in FIG. 1, the inside diameter $d_2$ of the cylindrical body portion 12 of the preform 10 is substantially uniform along the length of the body portion 12. In this development, the inside diameter $d_1$ of the neck portion 16 or 18 is also substantially uniform along the length of the neck portion. Preferably, the inside diameter $d_1$ of the neck portion 16 or 18 is larger than the inside diameter $d_2$ of the cylindrical body 12, and in a preferred embodiment the ratio of $d_1$ to $d_2$ is greater than or equal to 0.75, and more preferably this ratio is from about 1.0 to about 1.3.

The preform 10 shown in the drawing also includes a ring 20 around the preform at a location near the base of the first neck portion 16, and another ring 22 around the preform at a location near the base of the second neck portion 18. The ring 20 or 22, which may or may not be circumferentially continuous, provides a location where the end portions of the preform may be held or gripped or stretched during a blow molding or stretch blow molding process as will be explained in more detail below.

The preform 10, illustrated in FIG. 1, has first and second neck portions 16 and 18 which are dimensionally identical to one another. This structure may be preferred, for example, where the two container bodies being formed from the preform are intended to be dimensionally identical. It will be appreciated that where the pair of container bodies being formed are dimensionally identical, production rates may be increased. Further, after severing the blown component into two identical container bodies, there is no requirement that such container bodies be segregated in subsequent manufacturing, material handling, and processing operations.

Figure 2:
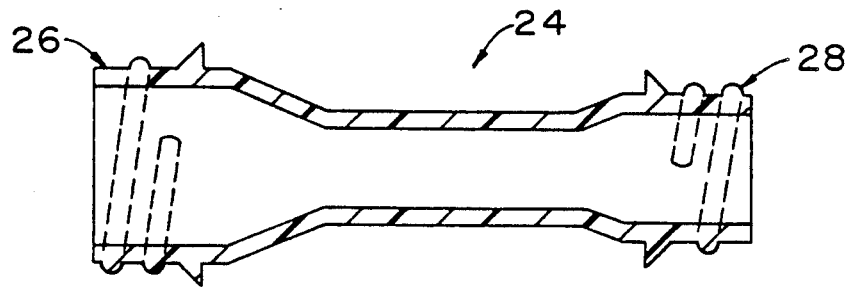
FIGS. 2 and 3 are cross-sectional views of alternative hollow preforms of the present invention.

In FIG. 2 is shown a preform 24 similar to the preform 10 shown in FIG. 1 in that the inside diameter of the body portion is substantially uniform. However, the first finished neck portion 26 is not the same, dimensionally, as the second finished neck portion 28. The first neck portion 26 has a larger diameter than the second neck portion 28 even though both are provided with a threaded finish. It will be appreciated that the finished necks provided at opposed longitudinal ends of the preform may have different types of finishes, in addition to having different dimensions. In these instances, the blow molding process will be directed to producing two different container bodies when the blown component is separated into two container bodies.

Figure 3:
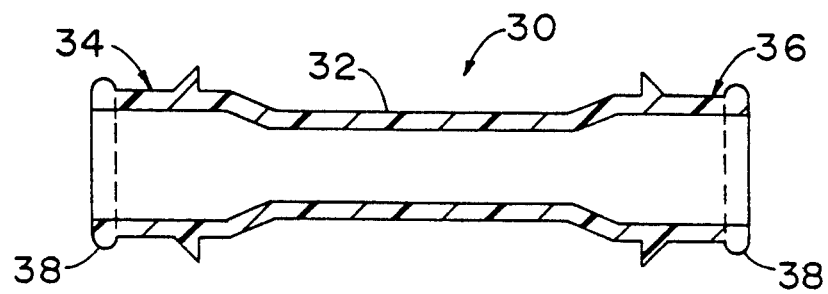

FIG. 3 illustrates an alternative preform 30 of the present invention. This preform 30 has a generally cylindrical, hollow body portion 32 and first and second neck portions 34 and 36 on the longitudinal ends of the body 32. The finished neck portions include a crown finish 38 as opposed to the threaded finish shown in FIGS. 1 and 2. It will be understood by those skilled in the art that any type of container finish may be provided on the preform of the present invention, provided that such neck portions do not require subsequent forming after the blow molding operation.

Figure 4:
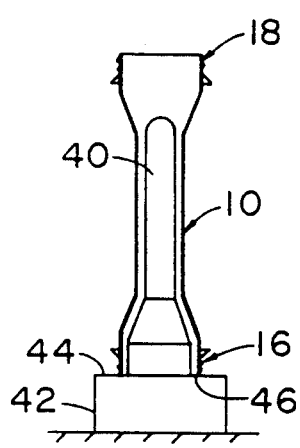
FIGS. 4-9 are fragmentary cross-sectional views of apparatus for producing a pair of container bodies, illustrating the production thereof through the following sequence of steps.

FIGS. 4 through 9 illustrate fragmentary cross-sectional views of apparatus for producing a pair of container bodies in accordance with the present invention. FIG. 4 shows a preform 10 positioned on a support collet 40, extending upwardly of a base 42. The base 42 has a shoulder 44 on which the outer face 46 of one of the necks 16 of the preform 10 sits. The preform 10 should fit easily over the support collet 40 with little or no interference therebetween.

Figure 5:
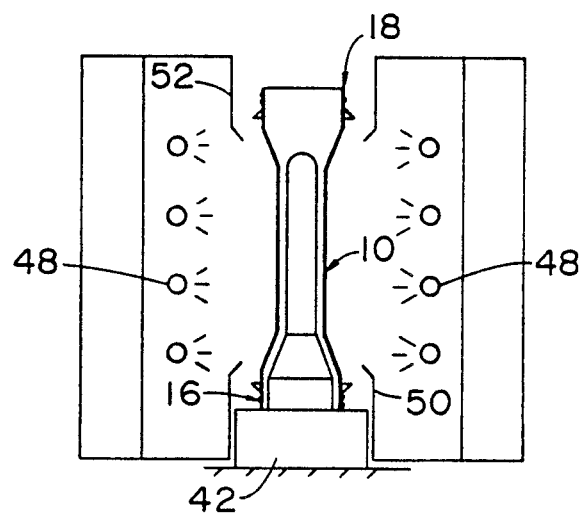

After the preform 10 has been positioned as shown in FIG. 4, the preform is heated, such as by the induction heating coils 48 shown in FIG. 5. Infrared radiation and radio frequency (rf) heating are also adequate methods of heating the preform. In a preferred embodiment shields 50 and 52 are provided around the finished neck portions 16 and 18, respectively, to minimize the heating of the finished neck portions of the preform and thus avoid softening and distortion of the neck. The part of the preform that is to be stretch blow molded is heated to a temperature above the glass transition temperature of the polymer, and below the melting temperature of the polymer. It has been found that for polyethylene terephthalate material heating the preform to a temperature on the order of about 90° C. to 105° C. is adequate to exceed the glass transition temperature yet avoid exceeding the melting temperature or inducing crystallinity (whitening) in the preform.

Figure 6:
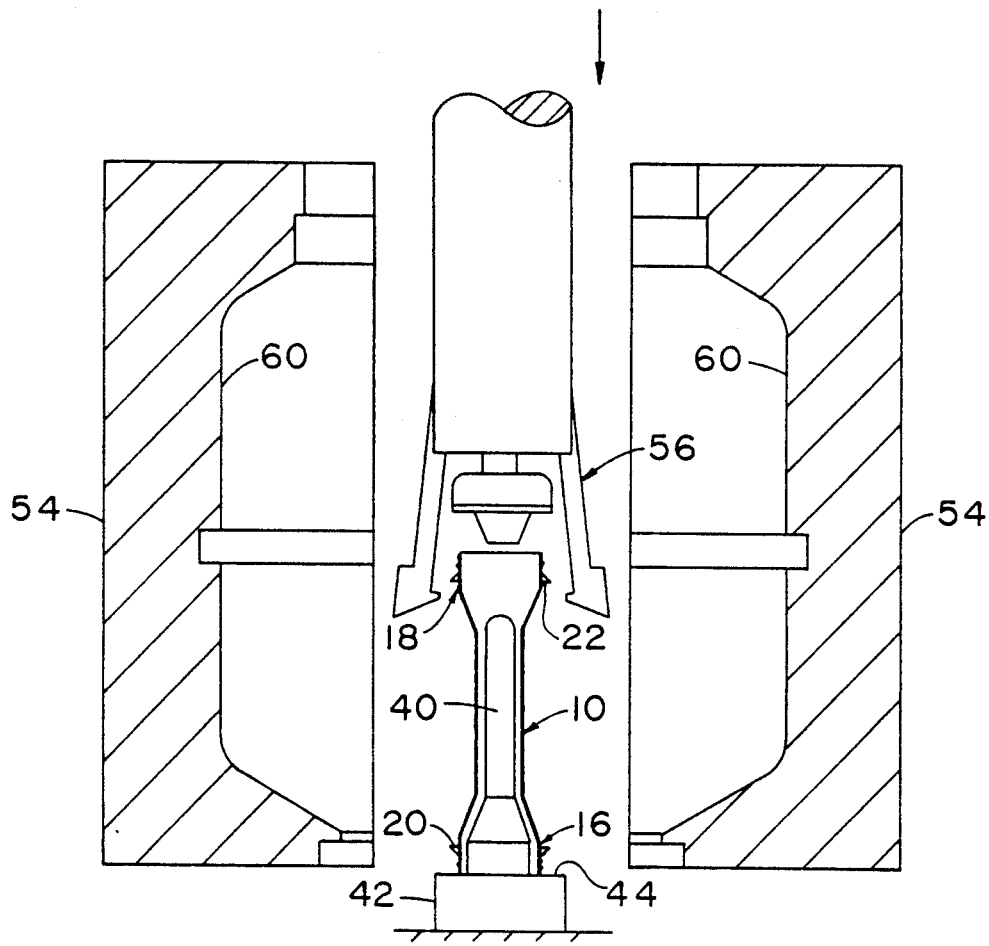

After the preform 10 is heated, the preform is disposed inside a mold, such as mold 54 shown in FIG. 6. The mold restricts the outward deformation of the preform during the blow molding process. The preform is positioned on the support collet 40 along the central axis of the mold. Substantially simultaneously with the disposition within the mold 54, the upper neck 18 of the preform is gripped. Preferably, the preform 10 is gripped at the ring 22 around the neck portion 18, with a suitable gripping device 56. With the first neck portion 16 held firmly at the base 42 of the support collet 40, the gripping device 56 is moved along the central axis of the mold in a direction away from the opposing neck portion to axially stretch the preform. During stretching, fluid pressure, such as with air, is introduced into the hollow chamber 14 of the preform 10. The fluid pressure is sufficient to stretch the preform transversely. Such transverse and axial stretching of the preform 10 is accomplished while the preform retains heat between the glass transition temperature and the melting temperature of the preform material.

The stretch blown component formed by this process has a first neck 16 at one end and a second neck 18 at the other longitudinal end, and a body 58 therebetween. The body 58 of the stretch blown component conforms dimensionally with the dimensions of the inside wall 60 of the mold 54.

Figure 10:
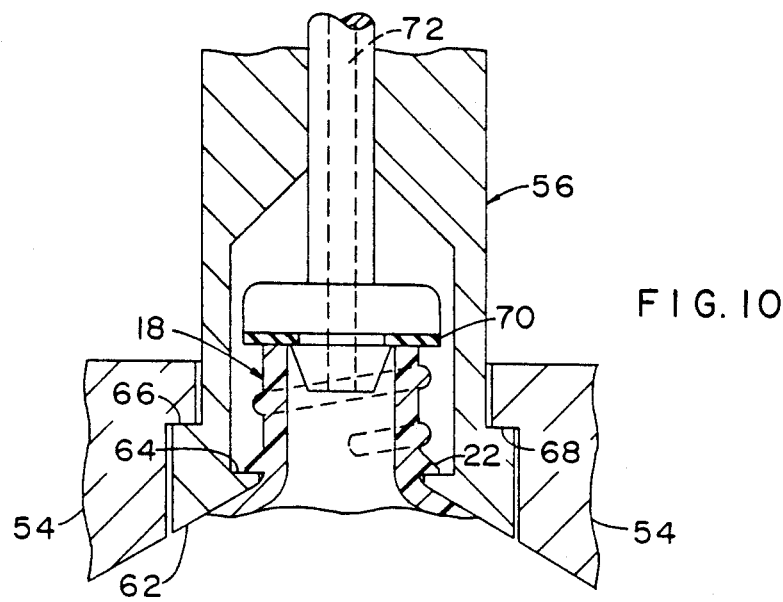
FIG. 10 is an enlarged cross-sectional view of a gripper used in the present invention.

FIG. 10 shows an enlarged cross-sectional view of a gripping device 56 of the present invention. The device 56 includes jaws 62 having a first ledge 64 which, when closed, engages the ring 22 around one neck 18 of the preform, and a second ledge 66 which restricts the axial movement of the gripper 56 at the point where the second ledge 66 engages a projecting step 68 on the closed mold 54. A generous lead-in chamfer on the ring 22 insures proper seating of the preform and prevents a clash in the event that a preform is not fed properly. As shown in FIG. 10, the closed gripper jaws 62 clamp the top finish of the neck against a sealing member 70 in suitable fashion to create an air tight seal against the top edge of the preform. In a preferred embodiment, four equally spaced jaws 62 are provided on the gripping device 56.

Figure 7:
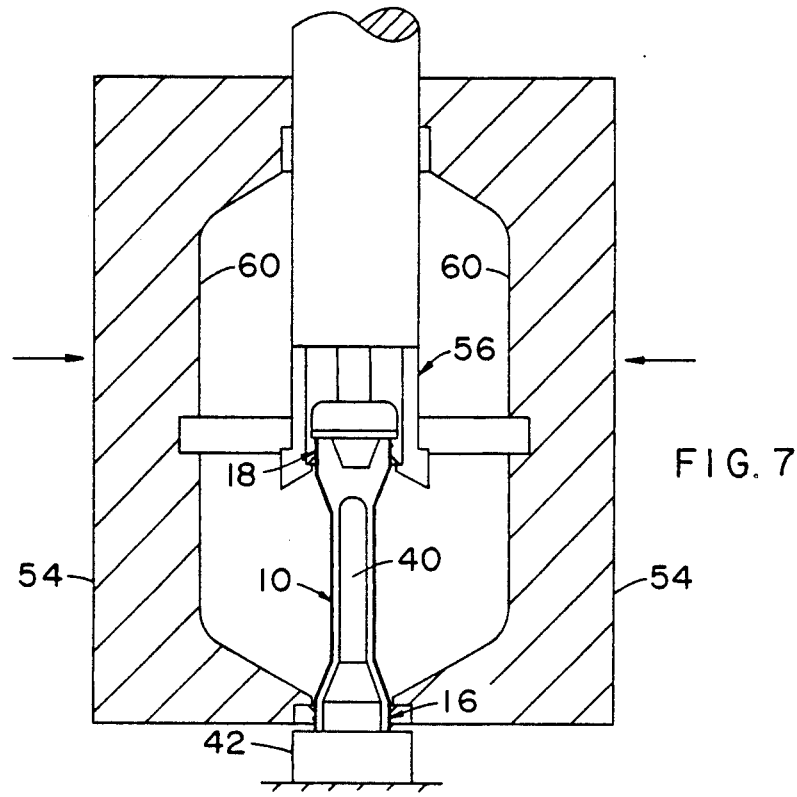

FIG. 7 shows the gripping device 56 engaged about the ring 22 on the upper neck 18 of the preform 10, while the lower neck 16 is held by the closed mold 54 on the base 42. The preform 10 is clamped, sealed and in a properly heated state for the stretch-blow operation.

Figure 8:
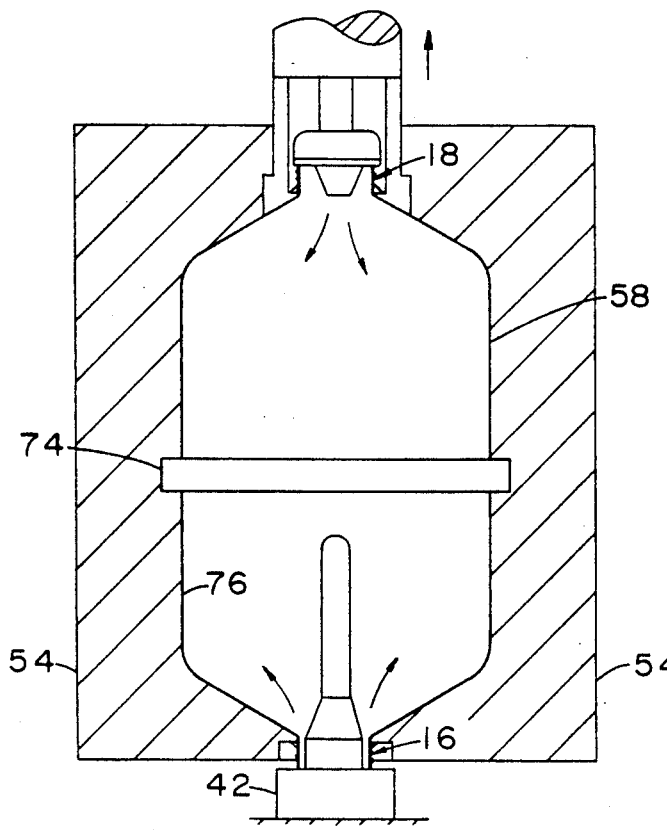
Figure 9:
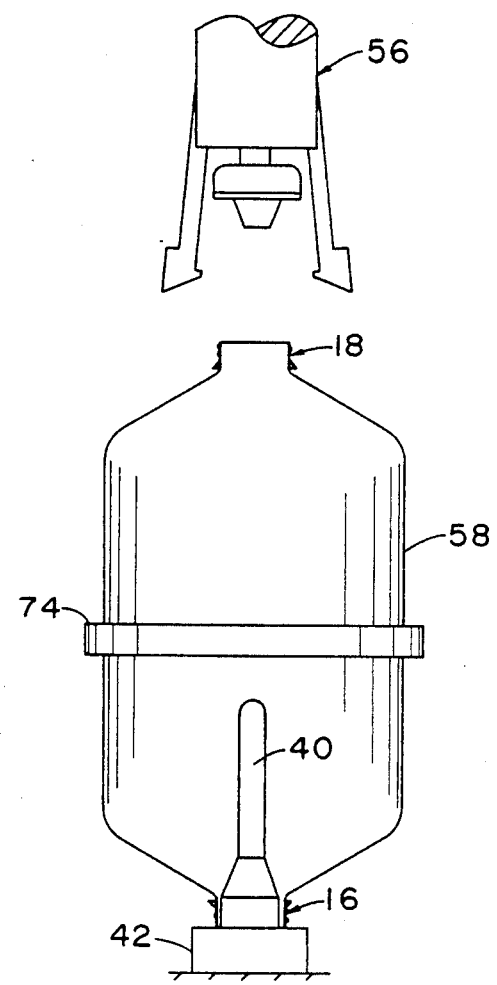

Axial stretch of the preform is accomplished by axial movement of the gripping device 56 from the position shown in FIG. 7 to the position shown in FIG. 8. Radial stretch is accomplished by introducing fluid pressure into the hollow chamber 14 of the heated preform 10. The fluid may be air, air with additives, an inert gas or an air-inert gas mixture. In a preferred embodiment, fluid pressure is provided by blowing air into the sealed preform 10. Air may be introduced through one or both ends of the preform. In one embodiment air is fed through the base 42 and simultaneously through a central passage 72 in the sealing portion of the gripping device 56, as shown in FIG. 10. The gripping device 56 moves during the stretch-blow process until the second ledge 66 of the jaw 62 bottoms against the projecting step 68 on the mold.

As shown in FIG. 8, a stretch blown component is formed by the stretch blow process. The component has a substantially cylindrical body and an open neck finish on both ends. The neck finish 16 and 18 on both ends of the blown component correspond dimensionally with the respective neck finish on the preform 10 from which the component is stretch blown. In a preferred embodiment as illustrated in FIG. 8, an outwardly extending circumferential flange 74 is blown into the substantially cylindrical sidewall 76 of the component. The flange 74 is centrally located in the sidewall 76, and provides a location where the component may be divided to form the body of a three-piece biaxially oriented container of this invention, as explained below.

After the component has been stretch blow molded, as shown in FIG. 8, it is appropriate to exhaust the fluid pressure from inside the component. This may be accomplished by opening the mold 54 and then releasing the gripping device 56 and thereby breaking the air tight seal against the upper neck 18. The component may then be transferred to an appropriate removal station.

Figure 11:
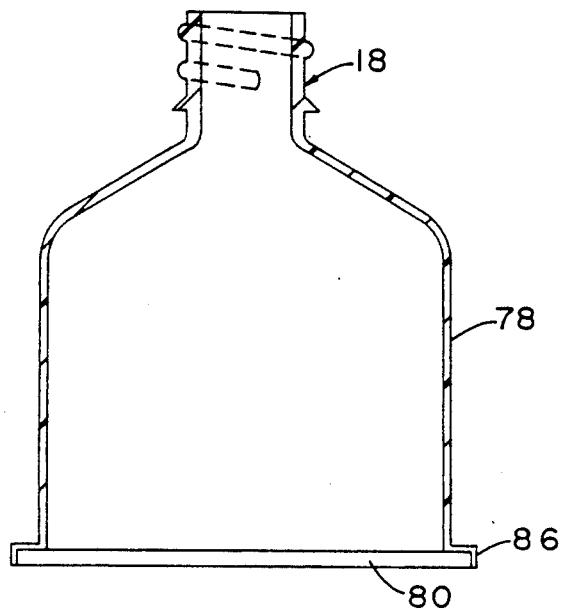
FIG. 11 is a cross-sectional view of a container body separated from the component shown in FIG. 9.
Figure 12:
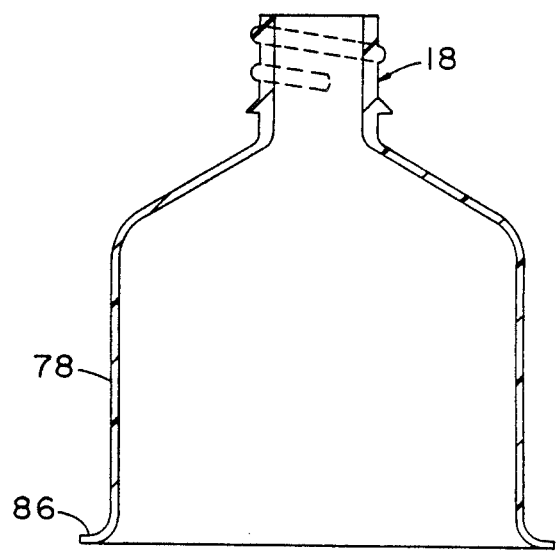
FIG. 12 is a cross-sectional view of a container body as shown in FIG. 11 after the peripheral edge around the open bottom of the container body has been flanged to receive an end panel.
Figure 13:
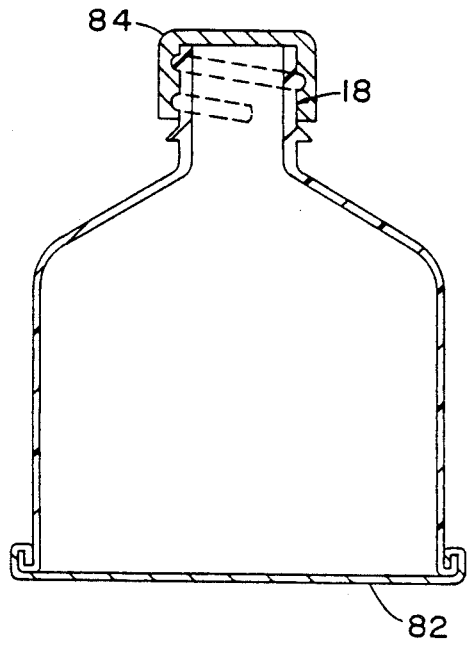
FIG. 13 is a cross-sectional view of an illustrative three-piece container of the present invention having a container body as shown in FIG. 12 with an end panel seamed to enclose the open bottom, and a closure mating with the finished neck of the container body.

The component comprises two container bodies integrally joined base-to-base at the circumferential flange 74. The component is separated by cutting through the circumferential flange 74. After cutting, each container body 78, as shown in FIG. 11, has an open neck finish 18 and an unfinished open bottom end portion 80. To form the three-piece biaxially oriented container of the present invention, an end panel 82 is applied, such as by double seaming, to the open bottom end portion 80, and a mating closure, such as a threaded closure 84 shown in FIG. 13, is applied to the neck portion 18. To apply the end panel 82 to the bottom end portion 80 of the polymer container body 78, the bottom edge 86 of the container body may have to be cut and/or trimmed. It may be possible to provide an in-mold trimming system to enable ejection from the stretch blown mold of already trimmed container bodies 78. In any event, the bottom edge 86 typically requires trimming, such as to the shape generally shown in FIG. 12, to receive an end panel 82 in a double seaming operation, with adequate body/end panel overlap within the seam. It will be appreciated that the component may be stretch blown into a variety of configurations, and may be blown without a circumferential flange 74. Such containers may be cut, then the bottom edge 86 may be forged over a flanging tool, or the like, to create a trimmed edge or seamable flange such as the edge 86 shown in FIG. 12. To provide a double seam of an end panel, such as an aluminum end panel, to a PET container body, standard chucks and rolls may be used on standard seamers at operating speeds which are known in the art. In addition to aluminum, the end panel may be made of steel, tinplate, polymer-aluminum laminate, polymer-steel laminate or a polymer such as polyethylene terephthalate. In certain seaming operations, the container body may have to be pressurized to provide an adequate top load for seaming. For certain applications, end panels may be snapped onto a trimmed bottom edge of the container body. Such applications include dry, rather than liquid, storage and non-pressurized applications. When both the end panel and the container are made of PET, end panels may be spin welded to the open bottom end of the container body.

The three-piece container of the present invention is characterized by a bottom end panel 82 which provides rigidity and base stability for the container, as opposed to a container having an integral bottom resulting from the blow-molding process. Additionally, the provision of the finished neck portions 16 and 18 on the preform 10 prior to the stretch blow process, which retain their dimensional integrity through the process, eliminates the need for subsequent neck finishing operations after the component is blow molded. Furthermore, the method of the present invention provides a tandem component, which when separated into two container bodies, results in little or no scrap in the process, which needs to be recovered, processed or discarded. The present process also results in increased output rates and thus reduced unit production costs, even considering the material costs of the end panel. Finally, the process of this invention produces a three-piece container having increased shelf life through a reduced surface area to volume ratio, and such container having a polymer body and a metallic end provides a container with higher barrier properties.

What is believed to be the best mode of this invention has been described above. It will be apparent to those skilled in the art that numerous variations of the illustrated and described details may be made without departing from the scope of this invention.

We claim:

1. A method of producing a pair of container bodies comprising the steps of:

providing a generally cylindrical, hollow preform of a thermoplastic polymer material having a cylindrical body comprising a sidewall and an open neck finish on first and second opposed longitudinal ends thereof, heating the preform having finished neck portions to a temperature above the polymer glass transition temperature and below the polymer melting temperature wherein during the heating of the preform the neck finish on both ends of the preform is shielded from at least a portion of the heating to minimize the heating of the neck finish portions and thus avoid softening and distortion of the neck finish portions.

stretching the heated preform longitudinally by applying force to at least one of the ends in such a manner that the neck finish portions are not subject to appreciable longitudinal stretching, sealing both open neck finish portions, then stretching the heated preform transversely by introducing fluid pressure therein sufficient to form a stretch blown component having a first neck at one end thereof, a second neck at the other longitudinal end thereof, and a body portion between the necks, and separating one end portion of the stretch blown component from the other end portion of the stretch blown component by severing the stretch blown component transversely through the body portion to provide two container bodies, each container body having a neck finish corresponding dimensionally with the respective neck finish on the preform from which the container bodies are stretch-blown and an open end spaced longitudinally from said neck.

2. A method as set forth in claim 1 wherein a shoulder is formed in each end of the stretch blown component by continuing the transverse stretching of the preform within a mold cavity, said shoulders connecting the first neck and the second neck to the body portion.

3. A method as set forth in claim 1 wherein the body portion comprises a substantially cylindrical sidewall.

4. A method as set forth in claim 1 wherein the preform is provided by extruding a thermoplastic polymer material into an elongated, hollow, cylindrical body, cutting the extruded cylinder into discrete cylinders and providing the neck finish on first and second opposed longitudinal ends of the discrete cylinder.

5. A method as set forth in claim 4 wherein the neck finish is provided by forming exterior threads on first and second opposed longitudinal ends of the cylinder.

6. A method as set forth in claim 4 wherein the opened neck finish is provided by spin welding cylindrical, hollow neck finish components to first and second opposed longitudinal ends of a cylindrical hollow member.

7. A method as set forth in claim 1 wherein each of the separated container bodies is dimensionally identical to the other.

8. A method as set forth in claim 1 wherein the ratio of the inside diameter of the neck finish on the preform to the inside diameter of the cylindrical body of the preform is greater than or equal to 0.75.

9. A method as set forth in claim 1 wherein the ratio of the inside diameter of the neck finish on the preform to the inside diameter of the cylindrical body of the preform is about 1.0 to 1.3.

10. A method as set forth in claim 1 wherein the heating of the preform is accomplished through the use of a method selected from the group consisting of infrared radiation and radio frequency heating.

11. A method as set forth in claim 1 wherein at least a portion of the longitudinal and transverse stretching occur simultaneously.

12. A method as set forth in claim 1 wherein the majority of the longitudinal stretching is accomplished by mechanical stretching of the preform along the longitudinal axis.

13. A method as set forth in claim 1 wherein the longitudinal stretching precedes the transverse stretching of the preform.

14. A method as set forth in claim 1 wherein the preform is grasped with clamping means having engaging teeth disposed about a ring portion of the preform extending outwardly of an outside surface of the preform and located at a longitudinally inner portion of each neck, which ring portion extends outwardly of the cylindrical preform about the circumference of the preform.

15. A method as set forth in claim 14 wherein the longitudinal stretching is accomplished by moving the clamping means away from one another at a substantially constant rate.

16. A method as set forth in claim 14 wherein one clamped end of the preform is held stationary while the other clamped end of the preform is moved to accomplish the longitudinal stretching.

17. A method as set forth in claim 14 wherein both clamped ends of the preform are moved away from one another to accomplish the longitudinal stretching.

18. A method as set forth in claim 1 wherein the preform is stretched transversely by introducing fluid into the hollow preform through one end of the preform.

19. A method as set forth in claim 1 wherein the preform is stretched transversely by introducing fluid into the hollow preform through both ends of the preform.

20. A method as set forth in claim 1 wherein the fluid is selected away from the group consisting of air, air with additives, an inert gas and an air-inert gas mixture.

21. A method as set forth in claim 1 further including the step of exhausting the fluid pressure from the stretch blown component after the stretching is completed.

22. A method as set forth in claim 1 further including the step of providing a mold about the preform against which the component is formed.

23. A method as set forth in claim 22 wherein the mold is provided with a substantially cylindrical cavity against which the cylindrical sidewall of the component is formed.

24. A method as set forth in claim 23 wherein the substantially cylindrical mold cavity includes a centrally located outwardly extending circumferential channel about the cylindrical mold cavity against which an outwardly extending circumferential flange is formed along the cylindrical sidewall of the component.

25. A method as set forth in claim 24 wherein the stretch-blown component is separated through the circumferential flange to provide two container bodies.

26. A method as set forth in claim 25 wherein the open bottom end of each separated container body is trimmed about a separated flange portion.

27. A method as set forth in claim 1 wherein the open bottom end of each separated container body is trimmed to receive an end panel.

28. A method as set forth in claim 27 wherein the open bottom end is trimmed prior to subsequent heating and flanging of the open bottom end of the container body over a flanging tool.

29. A method as set forth in claim 27 further including the step of seaming an end panel to the open bottom end of the container body.

30. A method as set forth in claim 29 wherein the end panel seamed to the hollow bottom end of the container body is substantially metallic.

31. A method as set forth in claim 29 wherein the end panel seamed to the bottom end of the container body is a material selected from the group consisting of aluminum, steel, tinplate, polymer-aluminum laminate, polymer-steel laminate and PET.

32. A method as set forth in claim 1 wherein the polymer is provided from a biaxially oriented, crystallizable material.

33. A method as set forth in claim 1 wherein the polymer is a material selected from the group consisting of polyester and polyamide.

34. A method as set forth in claim 1 wherein the preform is a material selected from the group consisting of PET, PEN and amorphous nylon.

35. A method as set forth in claim 1 wherein the preform is provided from PET mixed with a pigment.

36. A method as set forth in claim 1 wherein the preform comprises multiple layers of dissimilar thermoplastic polymer materials.

37. A method as set forth in claim 1 further including the step of spin welding an end panel to the open bottom end of a container body, wherein both the end panel and the container body comprise PET material.

38. A method of producing a pair of containers comprising the steps of:
  providing a generally cylindrical, hollow preform of an extruded thermoplastic polymer material selected from the group consisting of PET, PEN and amorphous nylon, said preform having an open neck finish on first and second opposed longitudinal ends thereof, and first and second ring portions extending outwardly of the preform at locations longitudinally inwardly of each neck about the circumference of the preform,
  heating the preform in the area between the finished neck portions to a temperature above the polymer glass transition temperature and below the polymer melting temperature wherein during the heating of the preform, the neck finish on both ends of the preform are shielded from at least a portion of the heating to minimize the heating of the neck finish portions and thus avoid softening and distortion of the neck finish portions.
  stretching the heated preform longitudinally by grasping at least one ring portion and applying force to at least one of the ends in such a manner that the neck finish portions are not subject to appreciable longitudinal stretching,
  sealing both open neck finish portions, then stretching the preform transversely by introducing fluid pressure into a hollow chamber of the preform sufficient to form a stretch blown component having a first neck at one end thereof, a second neck at the other longitudinal end thereof, a substantially cylindrical portion between the necks, and shoulder connecting the first and second necks to the body portion,
  separating one end portion of the stretch blown component from the other end portion of the stretch blown component by severing the stretch blown component transversely through the body portion to provide two container bodies, each container body having a neck finish corresponding dimensionally with the respective neck finish on the preform from which the container bodies are stretch-blown and an open end spaced longitudinally from said neck, and
  applying a metallic bottom end panel to close the open end of each container body to form a pair of containers.

* * * * *